March 15, 1960
E. A. ROCKWELL
2,928,293
BRAKE PEDAL MECHANISM
Filed July 2, 1954
2 Sheets-Sheet 1
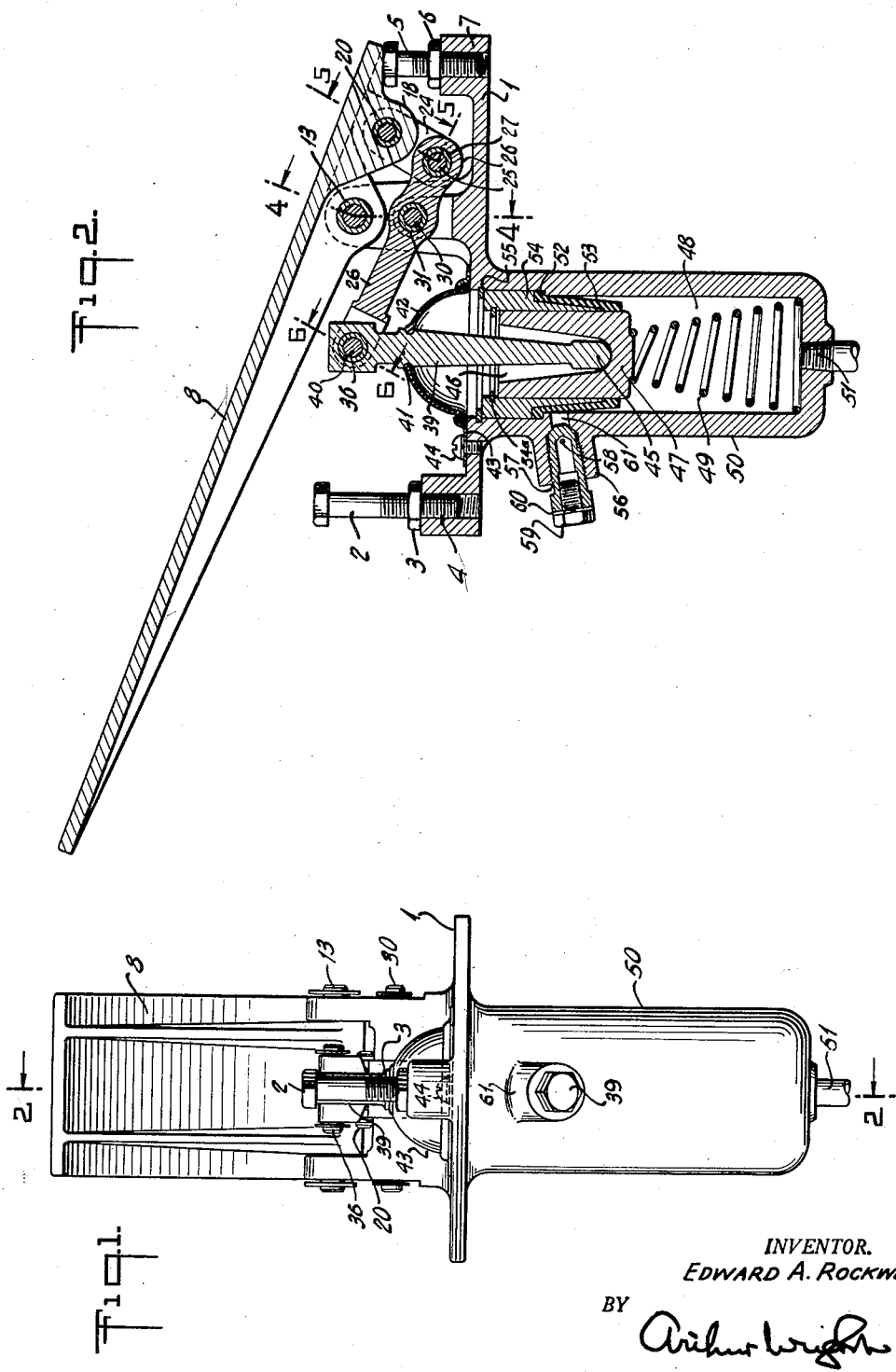
INVENTOR.
EDWARD A. ROCKWELL
BY
Arthur Wright
ATTORNEY

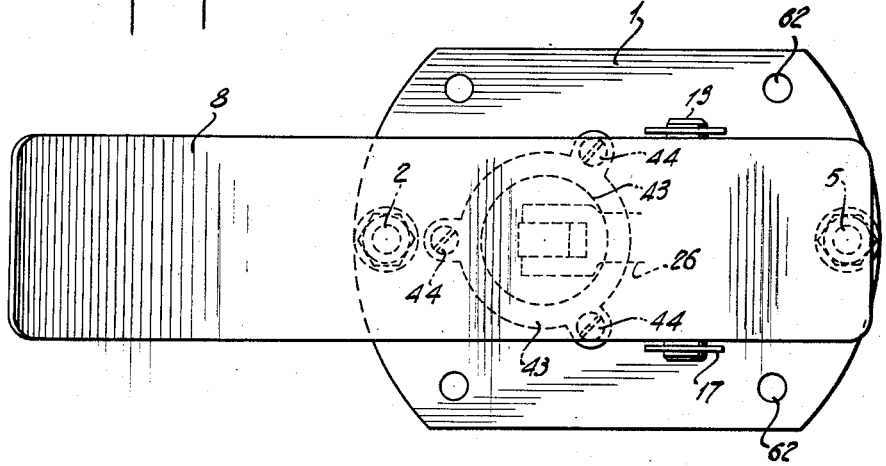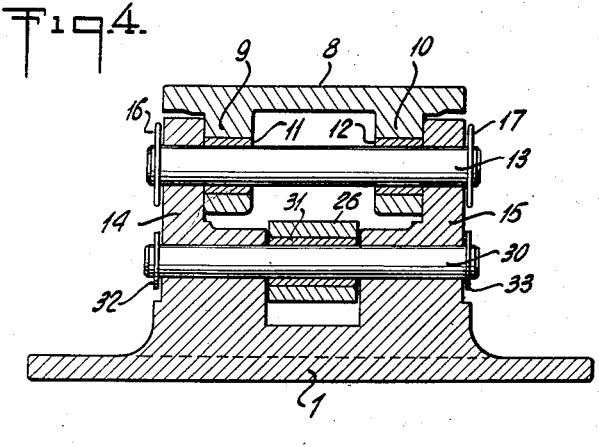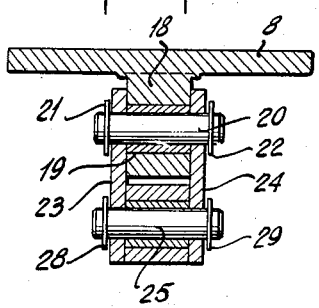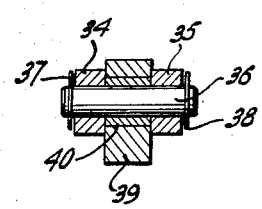
INVENTOR.
EDWARD A. ROCKWELL
ATTORNEY

United States Patent Office 2,928,293
Patented Mar. 15, 1960

2,928,293
BRAKE PEDAL MECHANISM
Edward A. Rockwell, Los Angeles, Calif.
Application July 2, 1954, Serial No. 440,996
5 Claims. (Cl. 74—512)

My invention relates particularly to a pedal or treadle mechanism which is capable of use for the operation of any desired device or accessory, but which is especially applicable for the operation of brakes, clutches or other accessories of automotive vehicles.

The object of my invention is to provide a pedal or treadle mechanism which may be used advantageously for the operation of any desired device, but which is so constructed as to be especially desirable and effective in the operation of automotive vehicle brakes, such, for instance, as automobile brakes. Another object is to provide a treadle mechanism of this character which is especially adapted for the hydraulic operation of valves for applying fluids under pressure for operating hydraulic brakes. Still another object is to provide a mechanism of this kind whereby the manual operation may be carried out by the movement of a pedal or treadle in such a manner as to provide a connection between the manual means and a hydraulic plunger operated thereby without the necessity of having springs in said connection, a spring being provided beyond the plunger to exert the reaction or "feel" on the treadle. A further object is to provide a progressive movement for the treadle or pedal which decreases with the advance of the brake means operated thereby so as to produce, finally, a very resistant or positive action on the hydraulic plunger or other means moved thereby. Another object is to provide a brake treadle mechanism for operating a brake valve mechanism in the system disclosed in my copending application upon Brake Valve Mechanism, executed May 10, 1946, Ser. No. 440,995, filed July 2, 1954, now Patent No. 2,896,666, and upon Power Steering System, executed May 10, 1946, Ser. No. 440,993, filed July 2, 1954, now Patent No. 2,896,733. Further objects of my invention will appear from the detailed description of the same hereinafter.

While my invention is capable of embodiment in many different forms, for the purpose of illustration I have shown only one embodiment thereof in the accompanying drawings, in which—

Fig. 1 is an elevation of the treadle and plunger cylinder operated thereby for controlling the brakes;

Fig. 2 is a plan view of the same;

Fig. 3 is a vertical section of the same taken on line 3—3 of Fig. 1;

Fig. 4 is an approximately vertical section of the same taken on line 4—4 of Fig. 3;

Fig. 5 is an approximately vertical section thereof taken on line 5—5 of Fig. 3; and Fig. 6 is an approximately vertical section of a portion thereof taken on line 6—6 of Fig. 3.

In the drawings, I have shown a plate 1 which is arranged to be attached to or used instead of a floorboard near the driver's seat of an automobile, said plate having an adjustable front stop bolt 2 held in place by a lock nut 3 in a screw-threaded boss 4 on said plate, also an adjustable rear stop bolt 5 held in place by a lock nut 6 in a rear screw-threaded boss 7. The adjustable stops 2 and 5 are provided for limiting the forward and rearward movements of a foot treadle 8, which is supported by means of ears 9 and 10 provided with bushings 11 and 12, respectively, to receive a pivot pin 13 passing through pivot ears 14 and 15 on the plate 1. The pivot pin 13 may be held in place by rings or cotter pins 16 and 17 secured to the ends thereof. Near the rear of the treadle 8 there is a depending lug 18 centrally located thereon, having a bushing 19 through which a pivot pin 20 is arranged to pass, which is held in position by cotter pins or rings 21 and 22 on the ends thereof. The pivot pin 20 is made long enough to receive on either side of the lug 18, links 23 and 24 which, at their lower ends, are pivoted to a pivot pin 25 passing through the same and through the rear end of a lever 26 having a bushing 27 and cotter pins or rings 28 and 29 located on the ends of the pivot pin 25, to hold the same in position. The lever 26, furthermore, has, passing through the same, a pivot pin 30 in a bushing 31 located vertically immediately beneath the pin 13, the said pivot pin 30 being sufficiently long to pass through the base of the ears 14 and 15 and being held therein by means of cotter pins or rings 32 and 33. It will be noted that the distance from the pivot 25 to the pivot 20 and to the pivot 30 is substantially the same but that the distance from the pivot 25 to the pivot 31 is shorter than the distance from the pivot 20 to the pivot 13. This produces less angularity between the links 23, 24 and the lever 26, than if the pivot 25 were located vertically beneath the pivot 20. The said lever 26, furthermore, extends forwardly beyond the pivot 31 to a point beneath the treadle 8, where it is provided with bifurcated ends 34 and 35 to receive a pivot pin 36 passing therethrough and having cotter pins or rings 37 and 38 for holding it in position so that a plunger rod 39, between the bifurcated ends 34 and 35 having a bushing 40, may be carried thereon. On account of the lever lengths in the linkage, the plunger rod 39 is movable downwardly more rapidly than the treadle 8. The plunger rod 39 has a peripheral recess 41 to receive the neck of a boot 42 having an upper thickened edge, the lower portion of which, which also has a thickened edge, is clamped to the plate 1 by a triangular ring 43, having screws 44 secured in the plate 1. The said plunger rod 39, furthermore, has at its lower end a knob 45 which fits in a tapered recess 46 in a plunger 47 located vertically beneath the plunger rod 39 in a plunger chamber 48, in which the plunger 47 is normally retracted by means of a conical reaction spring 49 to exert a reaction on the treadle 8 and which is supported at its lower end by a master cylinder 50 having a hydraulic liquid inlet and outlet port 51 for connection to a brake operating valve (not shown) or any other desired device to be operated by the movement of the liquid therefrom. The said cylinder 50, furthermore, has in its upper portion a shoulder 52 to receive a seal 53 of rubber or a rubber substitute, which is held against the shoulder 52 by a bushing 54 secured in place in the cylinder 50 by a split ring 55, although any other kind of seal may be used. A split ring 54a in the bushing 54 limits the upward movement of the plunger 47. At the side of the cylinder 50, furthermore, there is a screw-threaded boss 56 to receive an air bleeder screw 57 having a transverse aperture 58 therein normally closed by a removable screw 59 having a lock washer 60. A passageway 61 connects the interior of the boss 56 with the chamber 48. If desired, the plate 1 may be provided with four holes 62 for attachment of the plate to a floor-board or any other support.

In the operation of the brake treadle mechanism, the treadle 8 is normally moved into its elevated position by the plunger 47 which is supported by the conical spring 49. Also, it will be understood that within the chamber 48 there is present any desired brake liquid intended to be supplied from the port 51 to any desired point for the operation of an automobile brake, etc., for example, through the operation of hydraulic valves (not shown) in accordance wtih my copending applications aforesaid. The movement of the pedal 8 downwardly results in moving the plunger 47 downwardly, thus expelling the liquid through the outlet port 51 for the operation of the brake or brake valves, as desired. As the treadle 8 continues to move downwardly, however, it will be noted that, because of the location of the pivots of the linkage on which the treadle 8 is mounted, the lever 26 and links 23, 24 will assume a more flattened position as the treadle 8 advances, providing a changing mechanical advantage so that as the movement of the treadle progresses the plunger rod moves progressively more rapidly giving the effect of progressively greater resistance; that is a more resistant or rigid connection with the plunger rod 39 and the parts operated thereby. This increasing resistance or rigidity of the brake linkage adds to the increasing effectiveness of the automobile brake as the position of the pedal 8 advances. In the retracting movement of the treadle 8, the reverse conditions will take place. These characteristics of the movement of the treadle 8, accordingly, add to the nicety of control and sense of "feel," indicating at all times the extent of the braking effect or power being applied thereby to the brakes.

While I have described my invention above in detail I wish it to be understood that many changes may be made therein without departing from the spirit of the same.

I claim:

1. A treadle mechanism suitable for the operation of brakes comprising a treadle and an operating lever arranged in approximate parallelism on a fixed support, said treadle and lever being pivotally mounted at spaced points on the support, a link pivotally connecting said lever to said treadle, the operating lever also being connected to a device for performing work, said device including a plunger chamber, a spring-retracted plunger and a plunger actuating rod connected to the operating lever, and means including said link and lever forming a connection between said treadle and said plunger actuating rod, the mechanical advantage of said connection means being such that the rod moves progressively more rapidly upon uniform movement of the treadle.

2. A treadle mechanism suitable for the operation of brakes comprising a treadle and an operating lever arranged in approximate parallelism horizontally on a fixed support with the treadle over the operating lever, said treadle and lever being pivotally mounted intermediate the ends respectively at spaced points on the support, a link pivotally connecting the forward end of said lever to said treadle, the operating lever at the other end being connected to a device for performing work, said device including a plunger chamber, a spring-retracted plunger and a plunger actuating rod connected to the operating lever, and means including said link and lever forming a connection between said treadle and said plunger actuating rod, the mechanical advantage of said connection means being such that the rod moves progressively more rapidly upon uniform movement of the treadle.

3. A treadle mechanism suitable for the operation of brakes comprising a treadle and an operating lever mounted adjacent to each other on a fixed support, said treadle and lever being pivotally mounted at spaced points on the support, a link pivotally connecting adjacent ends of said treadle and said lever for transmitting movement of the treadle to said lever, the operating lever also being connected to a device for performing work, stop means operatively engaged by said treadle at a stop position, said treadle being mounted for movement from said stop position in a work performing direction to draw said link and in the return direction to push said link, and means including said link and lever forming a connection between said treadle and said device, the mechanical advantage of said connection means being such that as the movement of the treadle progresses at a uniform rate the other end of the operating lever and the device moves progressively more rapidly giving the effect of progressively greater resistance to movement of the treadle.

4. A treadle mechanism suitable for the operation of brakes comprising a treadle and an operating lever mounted adjacent to each other on a fixed support, said treadle and lever being pivotally mounted at spaced points on the support, a link pivotally connecting one end of each of said treadle and lever for transmitting movement of the treadle to said lever, the operating lever at the other end being connected to a device for performing work so that said link and lever provide a linkage for transmitting movement of said treadle to said device, said device offering a substantially uniform resistance to movement, the point of connection between said link and said treadle being farther away from the supporting pivot of the treadle than the point of connection between said link and said operating lever from the supporting pivot of the lever, and said device being mounted for movement over the effective range of movement of the pedal substantially at right angles to the path of movement of the point of connection of the same with the lever, stop means operatively engaged by said treadle at a stop position, said treadle being mounted for movement from said stop position in a work performing direction to draw said link and in the return direction to push said link, the linkage having a mechanical advantage which progressively diminishes upon movement of the treadle in the work performing direction from said stop position so that as the movement of the treadle progresses at a uniform rate in said work performing direction, said device moves progressively more rapidly giving the effect of progressively greater resistance to movement of the treadle.

5. A treadle mechanism comprising a treadle and an operating lever arranged horizontally on a fixed support in approximate parallelism with the treadle above the operating lever, a work performing device mounted for vertical movement on said support below said lever, means for pivotally mounting said treadle and lever intermediate the ends thereof respectively at spaced points on the support, a link pivotally connecting one arm of said lever to said treadle for transmitting movement of the treadle to draw said lever upon movement of said treadle in a work performing direction, the point of connection between said link and said treadle being farther away from the supporting pivot of the treadle than the length of the said one lever arm, the operating lever having a second arm, and means connecting said second arm to said device for performing work, the connection between said treadle and said device including said link and operating lever having a changing mechanical advantage upon uniform movement of the treadle in a work performing direction such that as the movement of the treadle progresses, the device moves progressively more rapidly giving the effect of progressively greater resistance to movement of the treadle.

References Cited in the file of this patent

UNITED STATES PATENTS

| 1,080,388 | Taigman | Dec. 2, 1913 |
|---|---|---|
| 1,531,467 | White | Mar. 31, 1925 |
| 1,551,450 | Wood | Aug. 25, 1925 |
| 1,650,443 | Gruich | Nov. 22, 1927 |
| 1,851,226 | White | Mar. 29, 1932 |
| 1,943,586 | Dapron | Jan. 16, 1934 |
| 2,033,433 | Leupold | Mar. 10, 1936 |
| 2,111,686 | Warren | Mar. 22, 1938 |
| 2,133,275 | Andres et al. | Oct. 18, 1938 |
| 2,168,719 | Staude | Aug. 8, 1939 |
| 2,307,619 | Brewer | Jan. 5, 1943 |
| 2,401,716 | Williams | June 4, 1946 |
| 2,536,854 | Parker | Jan. 2, 1951 |